United States Patent Office 3,169,153
Patented Feb. 9, 1965

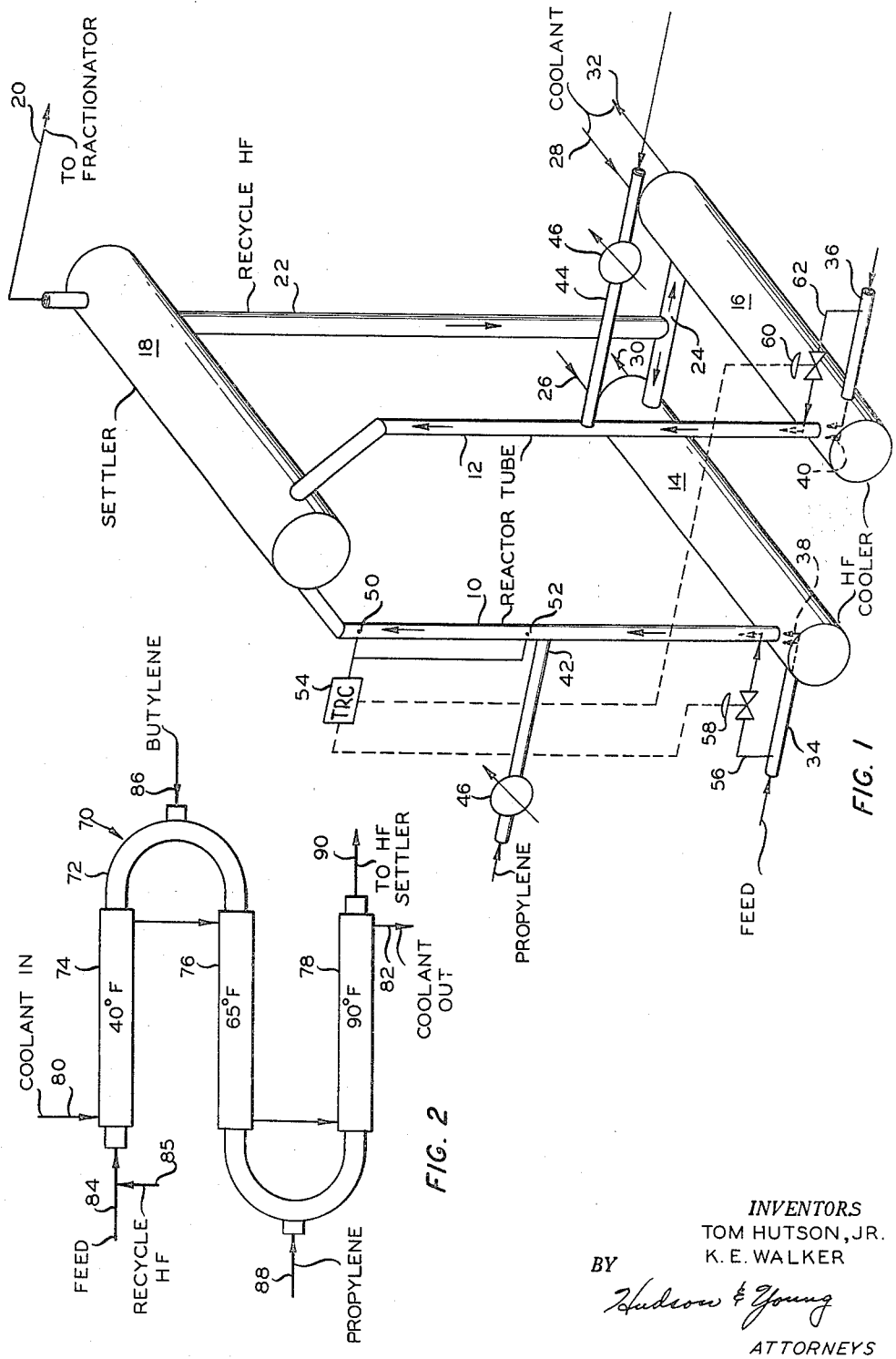

3,169,153
ALKYLATION PROCESS AND APPARATUS
Kenneth E. Walker and Thomas Hutson, Jr., both of Bartlesville, Okla., assignors to Phillips Petroleum Company, a corporation of Delaware
Filed Sept. 15, 1961, Ser. No. 138,502
12 Claims. (Cl. 260—683.48)

This invention relates to an improved process and apparatus for alkylating an isoparaffin with a plurality of olefins.

The alkylation of an isoparaffin such as isobutane or isopentane with olefins such as propylene, butylenes, and amylenes has been practiced utilizing various alkylation catalysts, particularly, HF acid. In applications where more than one olefin is to be reacted with an isoparaffin it is customary to either inject both olefins into a reactor, along with the isoparaffin, or to conduct two separate alkylation steps in different reactors. Some prefer alkylating in separate reactors with different olefins because a higher yield and higher quantity alkylate can be produced in each instance. This is due to the fact that optimum reaction conditions are different for different light olefins such as propylene, butylenes, and amylenes. This invention is concerned with a method and apparatus for alkylating an isoparaffin with two or more light olefins in a single reactor which results in a high yield of high quality alkylate.

Accordingly, it is an object of the invention to provide an improved process and apparatus for alkylating an isoparaffin with a plurality of olefins in a single reactor. A further object is to provide a more economical process and apparatus for alkylating an isoparaffin with a plurality of olefins. Another object is to provide a process and apparatus which produce an improved yield and quality of alkylate. Other objects of the invention will become apparent upon consideration of the accompanying disclosure.

A broad aspect of the invention comprises reacting a heavier olefin with an isoparaffin in the upstream end of an alkylation zone or reactor wherein the alkylation temperature is in an optimum range for the specific reaction involved (alkylation with the heavier olefin), whereby the temperature increases along the line of flow due to the exothermic reaction, and injecting the lighter olefin at an intermediate point in the reaction zone or reactor where the temperature is higher than at the inlet point of the heavier olefin so that the temperature in the section of the reaction zone or reactor downstream of the second inlet point is in an optimum range for the specific reaction involved (alkylation with the lighter olefin). Another still lighter olefin can be introduced downstream of the inlet point of the second olefin where the temperature is still higher and in an optimum range for the lightest olefin. To illustrate, when alkylating isobutane with a butylene and with propylene, the isobutane and butylene together with HF acid are introduced at the inlet end of the reactor and the temperature is controlled in the upstream end of the reactor within an optimum range for the alkylation of isobutane with butylene, as by regulating inlet temperature of feed and acid. The alkylation reaction causes an increase in temperature in the reactant stream which facilitates the reaction between propylene and isobutane when the propylene is introduced at an intermediate point, such as near the midpoint of the reactor. An elongated or tubular reactor of relatively small transverse cross section is desirable.

The isobutane-to-olefin ratio is in the range of 5 to 25 by volume and, preferably, is about 12. When alkylating with propylene and butylenes, it is preferred that 10 to 60 percent of the olefin feeds is propylene and the remainder is butylenes, the propylene and butylene being in separate feeds.

The catalyst is 88 to 92 percent by weight HF with a water content in the range of 0.1 to 1.0 percent and an acid-soluble oil content in the range of 0.1 to 1.0 percent, the remainder being dissolved hydrocarbons. The HF acid recycle rate is in the range of 0.25 to 5.5 volumes of HF per volume of hydrocarbon.

The reaction time is governed by the nature of the equipment used. In general this time of reaction is in the range of 20 to 40 seconds for the continuous tubular type reactor illustrated in application Serial No. 88,517, now abandoned, and application Serial No. 807,454, now abandoned. In conventional alkylation reactors the reaction time may vary from 5 to 20 minutes.

The optimum temperature range for the alkylation of isobutane with amylenes is from 40 to 80° F., for alkylation with butylenes the optimum range is from 60 to 100° F., and for alkylation of propylene with isobutane the optimum temperature range is 90 to 130° F. In the successive alkylation of isobutane with butylenes and with propylene the temperature differential between the inlet end of the reactor and the outlet end is in the range of 10 to 70° F. In operation in which amylenes, butylenes, and propylene are injected progressively downstream in this order, the optimum temperature differential between the inlet end and the outlet end of the reactor is in the range of 15 to 50° F. Similar temperature and temperature differentials are applicable to the alkylation of isopentane with these olefins.

A more complete understanding of the invention may be had by reference to the accompanying schematic drawing of which FIGURE 1 is a three dimensional or pictorial view of a preferred arrangement of apparatus in accordance with the invention and FIGURE 2 is a view of another embodiment of a reactor in the form of a serpentoid reactor for effecting alkylation.

Referring to FIGURE 1, a pair of tubular reactors 10 and 12 connect at their lower ends with acid coolers 14 and 16, respectively, and at their upper ends with settler 18. Settler 18 is provided with an alkylate takeoff line 20 which connects with the upper section of the settler and leads to a fractionation column (not shown). A recycle conduit 22 for acid connects with the bottom of settler 18 and with coolers 14 and 16 thru conduit 24. Coolers 14 and 16 are indirect heat exchangers which are connected with inlet coolant lines 26 and 28, respectively, and with outlet coolant lines 30 and 32, respectively. Feed lines 34 and 36 connect with the inlet ends of tubular reactors 10 and 12, respectively, thru the adjacent ends of coolers 14 and 16, respectively. Eductors 38 and 40 on the ends of lines 34 and 36, respectively, serve to inject the isoparaffin feed together with the heavier olefin into their respective tubular reactors and cause the flow of acid thru the reactors. The lighter olefin is injected into an intermediate section of the reactors thru feed lines 42 and 44 each of which is provided with a heat exchanger 46.

The flow thru the system shown in FIGURE 1 is effected by the injection and eductor effect of the feed entering thru lines 34 and 36, as well as the second olefin injected thru lines 42 and 44. The type of flow control involved is disclosed in the aforesaid U.S. application Serial No. 88,517.

Suitable temperature control may be effected by controlling the temperature of the acid in acid-cooler 14 and the temperature of the feed introduced thru both inlet lines 34 and 42 and the corresponding lines in the other reactor. Temperature control can also be effected by sensing the temperature at one or more points along the reactor downstream of the inlet end thereof such as at 50 and/or at 52 and utilizing temperature recorder controller 54 to control the amount of bypass of feed from line 34 into the reactor thru line 56 by means of motor valve 58 which is operated by temperature controller 54. A similar control arrangement is applicable to motor valve 60 in bypass line 62 on the other reactor.

Referring to FIGURE 2, a reactor 70 comprises a serpentoid tube 72 in which the principal horizontal sections 74, 76, and 78 are jacketed and cooled by indirect heat exchange with coolant introduced thru line 80 and withdrawn thru line 82. Acid, isoparaffin, and the high molecular weight olefin (amylene) are injected in the upstream end of tube 72 thru line 84, with recycled acid entering thru line 85. Butylene is introduced into the reactor tube intermediate sections 74 and 76 thru line 86 and propylene is injected thru line 88 into the reactor tube intermediate sections 76 and 78. The total alkylate is withdrawn thru line 90 and is passed to a conventional settler (not shown) for separation of acid and alkylate.

To illustrate operation in the apparatus of FIGURE 2, 1.1 liquid volumes of HF, 11 volumes of isobutane, and ⅓ volume of amylenes are injected thru line 84. ⅓ volume of butylenes is injected thru line 86 and ⅓ volume of propylene is injected thru line 88 to reactor tube 72. The flow thru the reactor should be at relatively high velocity, i.e., sufficient to provide turbulent mixing which requires a Reynolds number greater than 10,000. The temperature in section 74 is maintained at about 40° F., that in section 76 at about 65° F., and that in section 78 at about 90° F. These temperatures may be varied somewhat with good results.

In operation in the apparatus of FIGURE 1 conditions in both reactor risers are maintained substantially the same and description will be directed to only one reactor riser. A feed stream consisting of a mixture of isoparaffin and heavier olefin (butlylenes and/or amylenes) is injected at suitable pressure thru line 34 and educator 38 into the inlet end of reactor tube 10. Propylene is injected thru line 42 which is approximately midway between the eductor and temperature point 50. Initial temperature of the feed stream in line 34 when mixed with the catalyst adjacent the eductor is regulated so as to be suitable for the initiation of alkylation with the olefin. This first stage alkylate raises the temperature of the materials flowing thru the reactor so that at the point of introduction of propylene the temperature is within an optimum range for alkylation of remaining isoparaffin with propylene in the existing catalytic system.

*Example*

An alkylation operation carried out in apparatus similar to that shown in FIGURE 1 results in the following flow pattern:

| Stream: | Gal./min. |
|---|---|
| Recycle isobutane | 770.7 |
| Butylene | 64.3 |
| HF catalyst | 835.0 |
| Propylene (introduced above) | 64.3 |

The temperature at the bottom of the reactor is 75° F.; the temperature at the point of introduction of propylene is 120° F.; and at the point 50 the temperature is 128° F. Sufficient pressure is maintained to operate in liquid phase.

The yield of mixed alkylate obtained is 175 volume percent of olefin feed, and this is found to have a research octane rating (leaded) of 103.5.

Certain modifications of the invention will become apparent to those skilled in the art and the illustrative details disclosed are not to be construed as imposing unnecessary limitations on the invention.

We claim:

1. A process for alkylating an isoparaffin with two olefins of different weights which comprises introducing said isoparaffin in sufficient quantity to react with both olefins and the heavier olefin along with HF acid in the liquid phase into the upstream end of an elongated reaction zone free of indirect heat exchange means under reaction conditions including a temperature in an optimum range for alkylating with said heavier olefin, whereby the temperature in said zone increases downstream; introducing the lighter olefin into said zone at a point substantially downstream of the point of introduction of said heavier olefin where the temperature therein is in an optimum range for alkylating with said lighter olefin; applying sufficient pressure in said zone to maintain reactants in liquid phase; and recovering alkylate from both alkylation reactions along with acid from the downstream end of said zone.

2. The process of claim 1 wherein said isoparaffin is isobutane and said olefins are butylene and propylene.

3. The process of claim 2 wherein the temperature in the inlet end of said zone is maintained in the range of 60 to 100° F. and the temperature in the outlet end is maintained at a temperature in the range of 90 to 130° F. and between 10 and 70° F. higher than the temperature in said inlet end.

4. The process of claim 1 wherein said acid is recovered, cooled, and recycled to the inlet end of said reaction zone to control temperature therein.

5. The process of claim 1 wherein indirect heat exchange is effected along said reactor to help maintain said optimum ranges of temperature.

6. A process for alkylating an isoparaffin with a plurality of olefins of different weights which comprises passing said isoparaffin in sufficient quantity to react with all of said oleffins into the upstream end of an elongated continuous reaction zone in admixture with the heaviest of said olefins and with HF acid under alkylating conditions including a temperature in an optimum range for alkylating with said heaviest olefin and sufficient pressure to maintain reactants in liquid phase, whereby the temperature in said zone progressively increases downstream as alkylation construes; passing additional olefins in their decreasing order of weights separately into said reaction zone at successive spaced-apart points downstream so that as the temperature in said reaction zone increases each of said additional olefins is reacted with said isoparaffin at successively higher temperatures in an optimum range for that particular olefin; passing the reaction zone effluent to a settler to separate alkylate from acid; and separately recovering alkylate from said settler.

7. The process of claim 6 wherein amylene, butylene, and propylene are passed successively into said reactor and isobutane is introduced as said isoparaffin.

8. The process of claim 7 wherein temperature at the inlet end of said reactor is maintained in the range of about 40 to 90° F. and the temperature in the outlet end is maintained in the range of 90 to 130° F. and between 15 and 50° F. higher than the temperature in said inlet end.

9. Apparatus effective for alkylating an isoparaffin with a plurality of olefins which comprises an elongated continuous reactor having means at one end for introducing isoparaffin, an olefin, and acid catalyst and reaction product and acid outlet means at the downstream end; at least one additional inlet to said reactor in an intermediate section thereof for introduction of another olefin feed; a settler connected with the downstream end of said reactor having an outlet in its upper section for alkylate and an outlet in its lower section for acid; and recycle conduit means connecting said outlet for acid with the inlet means for acid in said reactor.

10. The apparatus of claim 9 including two inlets for olefin feed spaced apart along the line of flow in said reactor and wherein said reactor is free of indirect heat exchange means and said recycle conduit means is provided with indirect heat exchange means for cooling said acid.

11. The apparatus of claim 9 including indirect heat exchange means on said reactor.

12. The apparatus of claim 9 wherein said reactor is in serpentine form comprising alternate straight sections and bends, the straight sections having indirect heat exchange means thereon, and the bends being provided with inlets for olefin feed.

References Cited in the file of this patent

UNITED STATES PATENTS

| | | |
|---|---|---|
| 2,386,681 | Hadden | Oct. 9, 1945 |
| 2,431,500 | Penick | Nov. 25, 1947 |
| 2,476,750 | Matuszak | July 19, 1949 |
| 2,511,758 | Weinrich | June 13, 1950 |
| 2,881,235 | Van Pool | Apr. 7, 1959 |
| 2,910,522 | Gerhold et al. | Oct. 27, 1959 |